Jan. 1, 1963   I. V. EZOPOV   3,071,321
SLIDE RULE OF THE CIRCULAR TYPE
Filed Oct. 13, 1961

INVENTOR.
IGOR V. EZOPOV

United States Patent Office 3,071,321
Patented Jan. 1, 1963

3,071,321
SLIDE RULE OF THE CIRCULAR TYPE
Igor V. Ezopov, 336 Union Ave., Brooklyn 11, N.Y.
Filed Oct. 13, 1961, Ser. No. 144,908
1 Claim. (Cl. 235—84)

This invention relates to devices for performing mathematical functions to obtain a solution and more specifically to slide rules of the circular type.

At the present time slide rules, either linear or circular, present only one problem and solution at a time. When a solution to a problem requires a plurality of steps or functions, the first problem step is established to obtain the first solution. Using the first solution to establish the second problem step requires the first problem step, previously established, be deleted. Thus, when the multi-step problem is solved, to check the computations requires the problem to be reworked.

Accordingly, it is an object of this invention to provide a slide rule of simple construction that is accurate and used with facility.

Another object of this invention is to provide a slide rule for computing a problem to obtain a solution by a plurality of steps each being a mathematical function.

Another object of this invention is to provide a slide rule for solving a multi-step mathematical problem wherein only one additional scale is required for each problem step after the first which requires a pair of scales.

Still another object of this invention is to provide the aforementioned slide rule having means for varying the number of scales determinant upon the number of steps that are required by the specific problem to be solved.

And still another object of this invention is to provide a slide rule wherein the two parts of a problem or problem step is established on adjacent scales and the solution is indicated by the index mark of one of the scales on the other.

These and other objects and advantages will become apparent to those skilled in the art by referring to the following description taken together with the accompanying drawings, wherein one embodiment of the invention is illustrated by way of example. It is to be expressly understood, however, that the drawings are for illustrative purposes only and are not to be construed as defining the limits of the invention.

FIGURE 1 is a plan view of a circular slide rule that is constructed in accordance with the invention.

FIGURE 2 is an elevational view of the novel slide rule of FIGURE 1.

FIGURE 3 is an enlarged bottom plan view of the portion of the novel slide rule of FIGURE 1 that includes the means for locking the scales together and on which they rotate.

FIGURE 4 is a sectional elevation taken on line 4—4 of FIGURE 3.

To facilitate the description of the invention, it will be noted that only a limited number of scales are shown in the drawings, and will be described. This limitation, however, should not be construed as defining a limitation of the invention. Further, for clarity and understanding, only logarithmic scales are contemplated which correspond to the A and B scales of conventional slide rules. The subject invention is not directed to the scale or scales per se, but rather to the relationship of the scales one to the other, and to the overall construction of the slide rule.

Now referring to the drawings, and specifically to FIGURES 1 and 2, the novel slide rule as shown has five concentric discs 10, 10a, 10b, 10c, and 10d having a central opening 12, 12a, 12b, 12c, and 12d, respectively, for receiving a headed pivot pin 20 upon which the discs rotate. The discs 10 . . . 10d progressively increase in diameter and have peripheral logarithmic scales 14, 14a, 14b, 14c, and 14d, respectively. The periphery of each of the discs 10 . . . 10d may be tapered to provide a contiguous surface for ease of alignment and reading of the scales. Each of the scales 14 . . . 14d are logarithmic having nine numbered divisions commencing with its index that is numbered 1, and are disposed in opposition with the disposition of the adjacent scale or scales. It is well to note that conventional slide rules provide adjacent scales disposed in the same direction.

If a reference marker is desired, discs 10 . . . 10d may have respective overlay tab discs 16, 16a, 16b, 16c, and 16d with reference lines 18, 18a, 18b, 18c, and 18d, respectively, on the tab portions. The tabs may be transparent, or may be opaque with windows (not shown).

Referring now to FIGURES 3 and 4, the pin or pivot 20 has a head 22 which engages the uppermost disc 10 or its overlay disc 16 when used, and a shank 24 that passes through the openings 12 . . . 12d and protrudes past the last disc 10d. The shank has a plurality of axially spaced, annular grooves 26, 26a, 26b, and 26c.

A cap plate 30 has a central opening 36 to receive the end of the shank 24 of the pin 20 and holds the slide rule together when locked thereto. Towards this end, a rivet 38 slidably connects a slide clip 32 to the plate 30. The clip has a pair of arms 34 which engage one of the grooves 26, 26a, 26b, or 26c depending upon the number of discs 10 . . . 10d are being used.

Referring again to FIGURE 1, with the logarithmic scales 14 . . . 14d, as shown, the novel slide rule is used for multiplication and/or division. To solve a simple multiplication problem as shown on scales 14 and 14a, consider 2 times 2 which equals 4. The 2 of both scales 14 and 14a are placed in alignment with each other and the index numbered 1 of scale 14 is aligned with the solution 4 on scale 14a. To divide, however, 4 by 2, the index of scale 14 is aligned with 4 on scale 14a. By referring to the divisor 2 on scale 14, it is noted that the answer 2, on scale 14a is in alignment.

As shown in FIGURE 1, a simple progressive multiplication problem is established on the slide rule, such as: $2 \times 2 \times 3 \times 5 \times 8$ which equals 480. It should be fully realized that the complete problem is established on the slide rule when the final solution is obtained.

Having thus described my invention, I claim as new and desire to secure by Letters Patent:

A slide rule comprising a plurality of members each movable relative to the others and having a peripheral scale to form a series of adjacent scales, each of the scales being disposed in opposition to an adjacent scale, adjacent pairs of said scales being positioned to provide a solution of a predetermined mathematical problem, in which progressive pairs of adjacent scales solve a mathematical progression, and two pairs of the scales in progression have one scale in common, in which the members are a plurality of scalar discs progressively increasing in diameter and rotatable on a common pivot pin, in which the pivot pin has a plurality of axially spaced annular grooves, and a cap plate being disposed on the pin for holding the rotating members and having a locking member for engaging one of the grooves determined by the number of discs forming the slide rule, in which the locking member is a clip slidably connected to the cap plate and having a pair of arms for engaging diametrically opposite portions of one of the grooves.

References Cited in the file of this patent

UNITED STATES PATENTS

| | | |
|---|---|---|
| 1,495,805 | Rooney | May 27, 1924 |
| 2,394,226 | Baldocchi | Feb. 5, 1946 |